(12) United States Patent
Suzuki (10) Patent No.: US 11,009,346 B2
(45) Date of Patent: May 18, 2021

(54) ULTRASONIC MEASUREMENT APPARATUS AND ULTRASONIC MEASUREMENT METHOD

(71) Applicant: Hitachi, Ltd., Tokyo (JP)

(72) Inventor: Mutsumi Suzuki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 175 days.

(21) Appl. No.: 16/349,360

(22) PCT Filed: Nov. 20, 2017

(86) PCT No.: PCT/JP2017/041604
§ 371 (c)(1),
(2) Date: May 13, 2019

(87) PCT Pub. No.: WO2018/123343
PCT Pub. Date: Jul. 5, 2018

(65) Prior Publication Data
US 2019/0368869 A1    Dec. 5, 2019

(30) Foreign Application Priority Data

Dec. 28, 2016  (JP) .............................. JP2016-254659

(51) Int. Cl.
*G01B 17/00*   (2006.01)
*G01N 29/07*   (2006.01)

(52) U.S. Cl.
CPC ............. *G01B 17/00* (2013.01); *G01N 29/07* (2013.01)

(58) Field of Classification Search
CPC ................................ G01B 17/00; G01N 29/07
See application file for complete search history.

(56) References Cited

U.S. PATENT DOCUMENTS

| 3,896,662 A * | 7/1975 | Camp | .................... G01N 29/07 73/622 |
| 4,254,660 A * | 3/1981 | Prause | ................... G01B 17/00 73/597 |

(Continued)

FOREIGN PATENT DOCUMENTS

| JP | 61-215908 A | 9/1986 |
| JP | 4-194706 A | 7/1992 |

(Continued)

OTHER PUBLICATIONS

International Search Report (PCT/ISA/210) issued in PCT Application No. PCT/JP2017/041604 dated Feb. 13, 2018 with English translation (five (5) pages).

(Continued)

*Primary Examiner* — Francis C Gray
(74) *Attorney, Agent, or Firm* — Crowell & Moring LLP (57) ABSTRACT

An object is to provide an ultrasonic measurement apparatus capable of measuring a gap length between a rotational body and a casing without providing a reference position indication member on the rotational body in fluid machinery. The ultrasonic measurement apparatus which applies to fluid machinery having a rotational body as a measurement object includes: an ultrasonic probe installed and used outside a casing part of the fluid machinery, the casing part accommodating the rotational body; a measurement circuit unit electrically connected to the ultrasonic probe; and a reference signal generation unit. The measurement circuit unit includes a gap calculation unit configured to calculate a gap length between the rotational body and the casing part; the reference signal generation unit includes a rotary machine signal detection unit to be electrically connected to a rotary machine conversion unit, and a reference time generation unit electrically connected to the rotary machine signal detection unit; and the measurement circuit unit includes an (Continued)

offset time setting unit configured to make an offset time variable, the offset time spanning from a reference time signal outputted from the reference time generation unit to transmission by the ultrasonic probe.

8 Claims, 4 Drawing Sheets

(56) References Cited

U.S. PATENT DOCUMENTS

| | | | |
|---|---|---|---|
| 5,942,690 | A | 8/1999 | Shvetsky |
| 8,709,825 | B2 * | 4/2014 | Durack ............... C12N 5/06 436/180 |

FOREIGN PATENT DOCUMENTS

| | | | | |
|---|---|---|---|---|
| JP | 10-185538 | A | | 7/1998 |
| JP | 10185538 | A | * | 7/1998 |
| JP | 11-230733 | A | | 8/1999 |
| JP | 2007-295674 | A | | 11/2007 |

OTHER PUBLICATIONS

Japanese-language Written Opinion (PCT/ISA/237) issued in PCT Application No. PCT/JP2017/041604 dated Feb. 13, 2018 (four (4) pages).

* cited by examiner

ULTRASONIC MEASUREMENT APPARATUS AND ULTRASONIC MEASUREMENT METHOD

TECHNICAL FIELD

The present invention relates to an ultrasonic measurement apparatus and an ultrasonic measurement method in which fluid machinery having a rotational body is a measurement object.

BACKGROUND ART

Fluid machinery is machinery that converts electric power and fluid energy. Fluid machinery equipped with a rotational body such as a rotary blade includes a pump that inputs electric power to convert into fluid energy, a water turbine that extracts energy of input fluid as electric power, and the like. Further, fluid machinery using gas as fluid includes a compressor, a blower, a turbine, and the like.

In the pump, input electric power rotates a rotary machine (motor) to rotate a rotary blade, and the rotary blade moves fluid such as water. The rotary blade is also called impeller. In the water turbine, fluid such as water rotates a rotary blade, and converts its energy into a shaft driving force of a rotary shaft, to convert the shaft driving force into electric power using a rotary machine (electrical generator).

In such fluid machinery, wear and corrosion of a rotational body such as a rotary blade may occur. For example, in a pump, a rotary blade may be worn or corroded due to a chemical action caused by impurities contained in water as fluid, a physical action caused by foreign matter such as gravel contained in the fluid, or the like. Progress of deterioration such as wear may cause an influence such as deterioration of operation efficiency of the fluid machinery or a malfunction. Accordingly, in fluid machinery equipped with a rotary blade, a method for measuring a deteriorated state such as wear of the rotary blade and the inside of a casing has been demanded.

PTL 1 discloses a technique for measuring a distance between a rotational body and a casing by using ultrasonic waves for the rotational body such as a compressor or a turbine.

CITATION LIST

Patent Literature

PTL 1: JP H10-185538 A

SUMMARY OF INVENTION

Technical Problem

However, in the conventional technique described in PTL 1, it is necessary to provide "a member indicating a reference position" such as a magnet on the rotational body installed in the fluid machinery. This is for specifying a reference position of a rotation angle of the rotational body. Therefore, the conventional technique described in PTL 1 has a problem that it cannot be used in fluid machinery in which such member indicating a reference position is not installed on the rotational body. Particularly in existing pumps, water turbines, and the like, there are many cases where no member indicating a reference position such as a magnet is installed on a rotational body such as a rotary blade. Therefore, there has been a problem that a deteriorated state of the rotary blade in existing pumps or water turbines cannot be measured.

In view of the above problems, it is an object of the present invention to provide an ultrasonic measurement apparatus capable of measuring a gap length between a rotational body and a casing without providing a reference position indication member on the rotational body in fluid machinery.

Solution to Problem

The present invention solves the above problem by using the following configuration.

An ultrasonic measurement apparatus which applies to fluid machinery having a rotational body as a measurement object includes: an ultrasonic probe installed and used outside a casing part of the fluid machinery, the casing part accommodating the rotational body; a measurement circuit unit electrically connected to the ultrasonic probe; and a reference signal generation unit. In the ultrasonic measurement apparatus, the measurement circuit unit includes a gap calculation unit configured to calculate a gap length between the rotational body and the casing part, the reference signal generation unit includes a rotary machine signal detection unit to be electrically connected to a rotary machine conversion unit, and a reference time generation unit electrically connected to the rotary machine signal detection unit, and the measurement circuit unit includes an offset time setting unit configured to make an offset time variable, the offset time spanning from a reference time signal outputted from the reference time generation unit to transmission by the ultrasonic probe.

Advantageous Effects of Invention

According to the ultrasonic measurement apparatus of the present invention, it is possible to measure a gap length between the rotational body and the casing without providing a reference position indication member on the rotational body in the fluid machinery.

DESCRIPTION OF EMBODIMENTS

Hereinafter, embodiments of the present invention will be described with reference to the drawings. It should be noted that the following is merely an example of implementation and is not intended to limit the contents of the invention to the following specific embodiments. The invention itself can be implemented in various modes in accordance with the contents described in the claims.

First Embodiment

Figure 1:
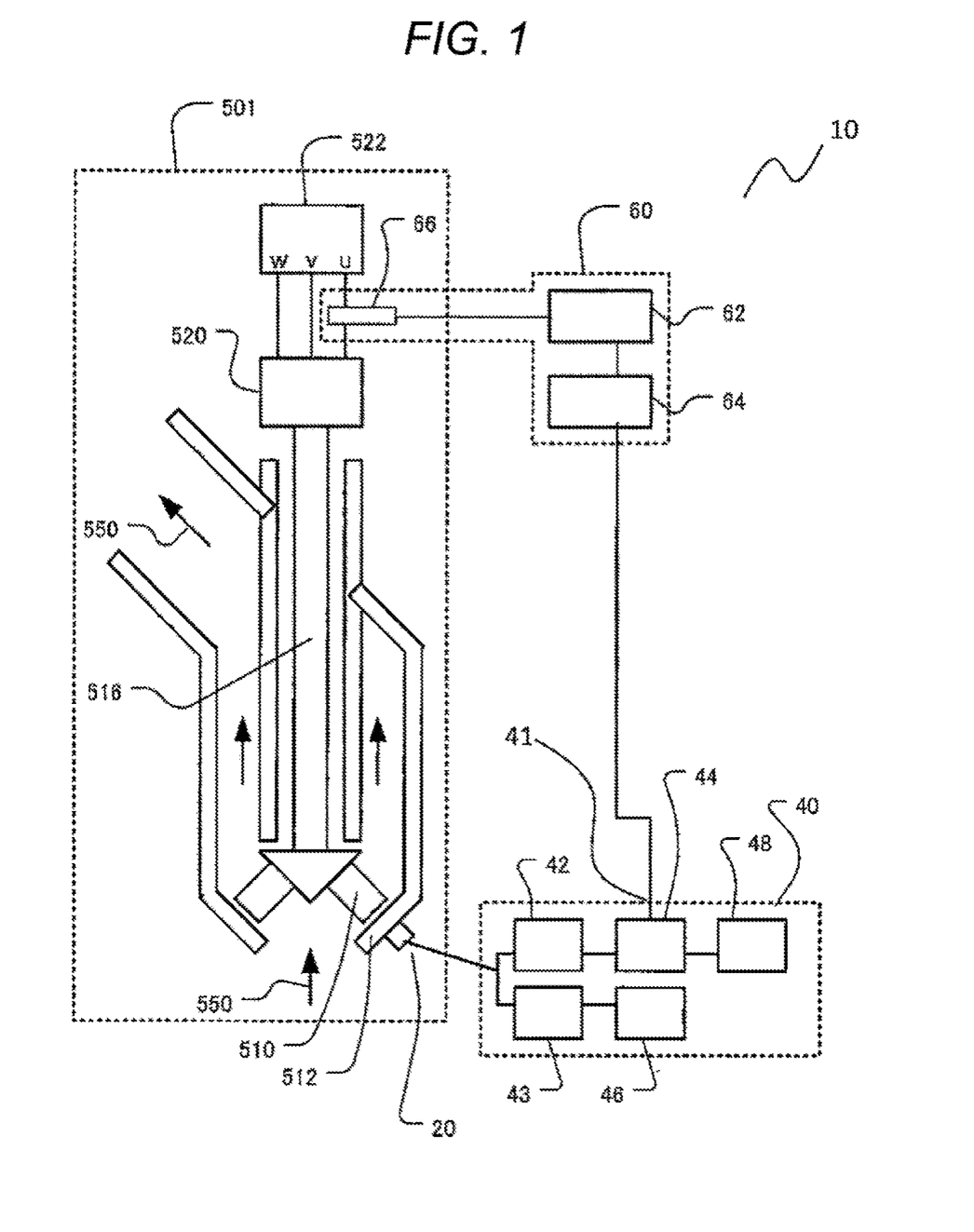
FIG. 1 is a diagram showing a configuration of an ultrasonic measurement apparatus according to a first embodiment.

Hereinafter, with reference to FIG. 1, a configuration of an ultrasonic measurement apparatus 10 according to a first embodiment will be described.

Note that the terms used in this specification are defined as follows. Fluid machinery is machinery that converts electric power and fluid energy. Fluid machinery equipped with a rotary blade includes a pump that inputs electric power to convert into fluid energy, a water turbine that extracts energy of input fluid as electric power, and the like. Further, as fluid machinery using gas as fluid, there are a compressor, a blower, a turbine, and the like. The rotary blade is also called impeller. The pump rotates a rotary machine (motor) with input electric power to rotate a rotary blade, and the rotary blade moves fluid such as water. The water turbine rotates a rotary blade with fluid such as water, and converts into a shaft driving force of a rotary shaft, to convert the shaft driving force into electric power with a rotary machine (electrical generator).

In the first embodiment, an example of a pump 501 will be described as fluid machinery as a measurement object of the ultrasonic measurement apparatus 10.

(Configuration of Fluid Machinery as Measurement Object)

First, a configuration of the fluid machinery (pump 501), which is a measurement object of the ultrasonic measurement apparatus 10, will be described. The pump 501 shown in FIG. 1 is an example of a vertical-axis mixed flow pump. The vertical-axis mixed flow pump is a pump used for water supply and sewerage and for agricultural irrigation.

Inside a casing 512 (housing) of the pump 501, a rotary blade 510 (also called an impeller) is mounted. The rotary blade 510 is installed on a main shaft 516, and the main shaft 516 is mechanically connected to a rotary machine 520. By the main shaft 516, a rotating force of the rotary machine 520 is transmitted to the rotary blade 510. The rotary machine 520 is electrically connected with a rotary machine driving unit 522.

The rotary machine 520 is rotated by AC power output to the rotary machine 520 by the rotary machine driving unit 522. Typically, the AC power input to the rotary machine 520 is a three-phase AC power consisting of a U-phase, a V-phase, and a W-phase. Rotational energy of the rotary machine 520 is transmitted to the rotary blade 510 by the main shaft 516. As the rotary blade 510 rotates, fluid such as water is moved by an action with a stator blade (not shown) fixed to the casing, enabling a function as a pump. In FIG. 1, a fluid flow 550 is indicated by arrows.

(Configuration of Ultrasonic Measurement Apparatus)

Next, a configuration of the ultrasonic measurement apparatus 10 will be described. The ultrasonic measurement apparatus 10 includes an ultrasonic probe 20, a measurement circuit unit 40, and a reference signal generation unit 60.

The ultrasonic probe 20 is installed outside the casing 512 of the fluid machinery. The ultrasonic probe 20 is electrically connected to the measurement circuit unit 40 to be described later. The ultrasonic probe 20 generates an ultrasonic wave with an excitation signal outputted from the measurement circuit unit 40. Then, the ultrasonic probe 20 converts a received ultrasonic wave into an electric signal, and inputs the electric signal to the measurement circuit unit 40.

The measurement circuit unit 40 includes a transmission unit 42, a reception unit 43, a synchronization signal input unit 41, an offset time setting unit 44, a gap length calculation unit 46, and an offset time sweep unit 48.

With a trigger signal input to the synchronization signal input unit 41 as a time starting point, after delaying for an offset time tof with the offset time setting unit 44, the transmission unit 42 generates an ultrasonic excitation signal and excites the ultrasonic probe 20. The ultrasonic wave generated by the ultrasonic probe 20 is transmitted into the fluid machinery.

The ultrasonic wave passes through inside the casing 512 and the fluid, and radiates the rotary blade 510. Then, the ultrasonic wave is reflected on a surface of the rotary blade 510, and enters the ultrasonic probe 20 via the fluid and the inside of the casing 512. Then, the ultrasonic probe converts the ultrasonic wave into an electric signal, and the electric signal is input to the reception unit 43 of the measurement circuit unit 40. This electric signal input to the reception unit 43 is referred to as a reflected wave signal. The reflected wave signal input to the reception unit 43 is amplified by the reception unit 43, and then input to the gap length calculation unit 46. The gap length calculation unit 46 calculates a gap length L between the rotary blade 510 and an inner wall of the casing 512, from the reflected wave signal by a method described later.

(Reference Signal Generation Unit)

The reference signal generation unit 60 includes a rotary machine signal detection unit 62 and a reference time calculation unit 64. The rotary machine signal detection unit is electrically connected to the rotary machine driving unit 522. In the present embodiment, the rotary machine signal detection unit 62 includes a current detection device 66. The current detection device 66 is a clamp-type current detection device 66, which is clamped and connected to wiring between the rotary machine driving unit 522 and the rotary machine 520. That is, by being connected in an AC manner instead of being connected in a DC manner to wiring of the rotary machine driving unit 522, the current detection device 66 detects a leakage magnetic field and detects an energizing current in the wiring. Using the clamp-type current detection device 66 in this way enables measurement of the gap length L on existing fluid machinery, without stopping the driving operation. The current detection device 66 may simply be connected to any one of three-phase wires of the U-phase, the V-phase, and the W-phase between the rotary machine driving unit 522 and the rotary machine 520. Further, as another configuration of the rotary machine signal detection unit 62, when a synchronization signal synchronized with one rotation is output from the rotary machine driving unit 522, the synchronization signal may be input to the rotary machine signal detection unit 62.

On the basis of the signal detected by the rotary machine signal detection unit 62, the reference time calculation unit 64 generates a reference time signal at every one cycle corresponding to one rotation of the rotational body (rotary blade). A specific generation method will be described with reference to FIG. 2.

In the present embodiment, an example using a four-pole induction motor with 50 Hz drive as a rotary machine is shown. As schematically shown in the upper part of FIG. 2, the current detection device 66 provides a current waveform signal of approximately 50 Hz. Since it is a four-pole electric motor, the rotary blade makes one rotation with two cycles of rotary machine driving current. Therefore, as schematically shown in the lower part of FIG. 2, a reference time signal is generated at a specific phase time of every two cycles of the current waveform signal.

Figure 2:
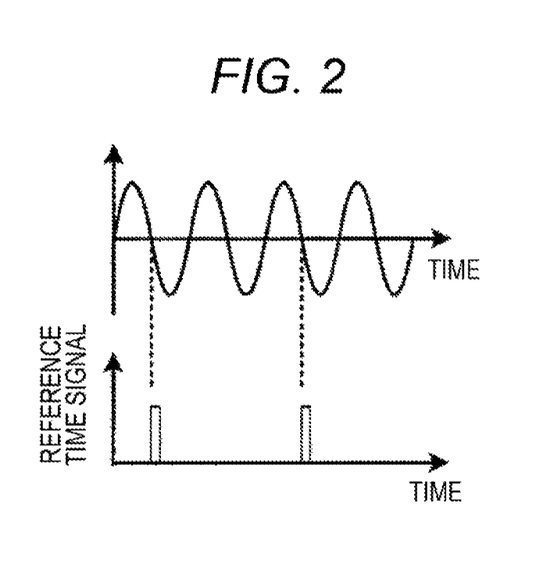
FIG. 2 is a view for explaining an operation of a reference signal generation unit in the first embodiment.

A specific circuit configuration of the reference time calculation unit 64 may be such that an internal signal synchronized with the current waveform signal is generated by a tuning circuit by a phase locked loop (PLL), and then a reference signal is generated at a specific phase time of every two cycles by a frequency divider circuit. It should be noted that the "specific phase time" may be any phase time as long as it is fixed to a specific phase in one rotation cycle of the rotary blade. The reference time signal thus generated is input to the offset time setting unit 44 of the measurement circuit unit 40.

Figure 3:
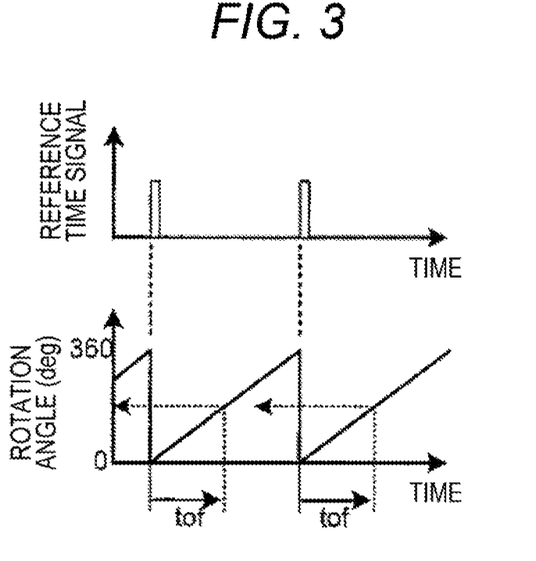
FIG. 3 is a view for explaining an operation of an offset time in the first embodiment.

FIG. 3 is a view schematically showing a relationship between a rotation angle of the rotational body (rotary blade 510) and time. Every time a reference time signal is generated, the rotation angle rotates in a range of 0 to 360 degrees. At a time when the offset time tof has passed with respect to the reference time signal as a time origin, the offset time setting unit 44 transmits a trigger signal to the transmission unit 42, thereby generating an ultrasonic wave from the ultrasonic probe 20.

As can be seen from FIG. 3, the offset time tof specifies a rotation angle of a measurement point of the rotational body (rotary blade 510), that is, a phase angle. Therefore, appropriately setting the offset time tof enables measurement of the gap length L at any rotation angle of the rotational body (rotary blade 510).

The rotary blade is often formed by a plurality of rotor blades. In that case, by switching to a plurality of offset times tof and operating the ultrasonic measurement apparatus, it is possible to measure which rotor blade is worn.

Further, there is an effect that the following information can be measured by providing the offset time sweep unit 48 inside the measurement circuit unit and measuring the gap length L while sweeping the offset time tof.

(1) Distribution of wear deterioration of rotor blades (distribution of a degree of wear deterioration according to a location)

(2) A structure of the rotary blade can be known even if a structure of rotary blade is unknown.

Particularly in a case where existing fluid machinery is to be a measurement object, the structure of the rotary blade, for example, the number and shape of the rotor blades may be unknown in some cases. In such a case, it is possible to know the structure of the rotary blade by performing the offset time sweep.

(Calculation of Gap Length from Reflected Wave Signal)

Figure 4:
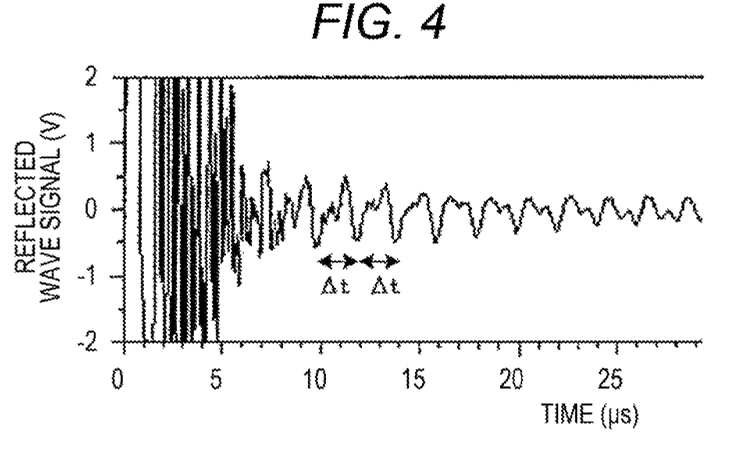
FIG. 4 is a view for explaining an operation of a gap calculation unit in the first embodiment.

FIG. 4 shows an example of a reflected wave signal. A horizontal axis is an elapsed time from transmission of an ultrasonic pulse, and a vertical axis is a value of the reflected wave signal.

A large amplitude signal appearing during a period of 0 to 7 μs is a noise signal due to multiple reflection of the ultrasonic wave inside a wall of the casing 512. This signal is a signal to become noise since it is a signal unrelated to a gap length between the rotary blade and the casing.

After 10 μs, a signal repeated at a cycle of Δt appears. This is a signal repeatedly appearing periodically due to multiple reflection of the ultrasonic wave between the rotary blade and the casing. Since the ultrasonic wave reciprocates once in a period of a repetition period Δt, the gap length L can be obtained by (Formula 1).

$$L = c\Delta t/2 \quad \text{(Formula 1)}$$

Here, c is a speed of sound of an ultrasonic wave in fluid. In the present embodiment, c=1500 (m/s) since the fluid is water.

As a method of measuring the gap length L, an elapsed time until a signal of the first reflection on the rotary blade returns to the ultrasonic probe may be measured.

There are the following effects in the method of calculating the gap length L by using the period Δt of multiple reflected waves by the multiple reflection in the fluid, used in the present embodiment.

(1) Since measurement can be performed after attenuation of a noise signal due to multiple reflection inside the casing wall, the influence of noise is reduced, and accurate measurement is possible.

(2) By using an average value of a plurality of repetition periods Δt, the gap length L can be measured with high accuracy.

Figure 5:
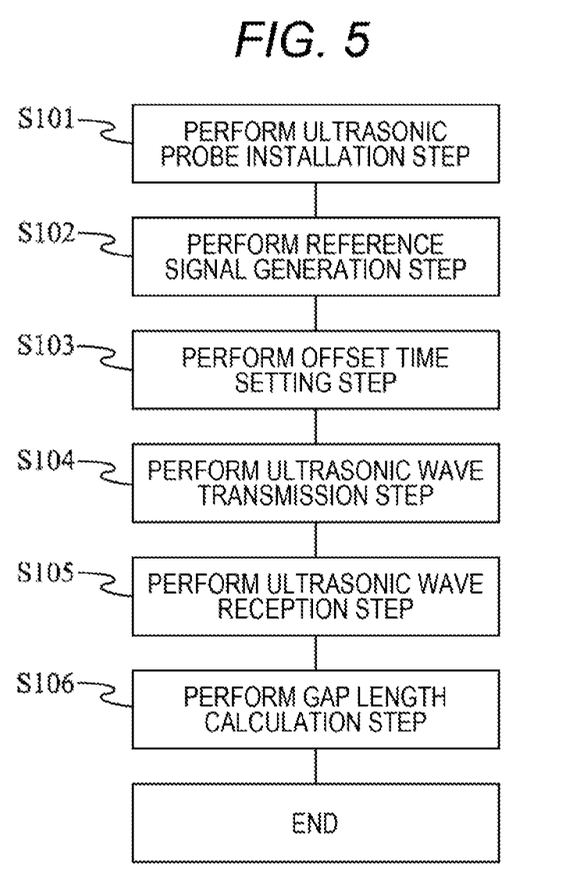
FIG. 5 is a flowchart for explaining a gap length calculation operation in the first embodiment.

Finally, FIG. 5 shows a flow chart for explaining a gap length calculation operation in the first embodiment. The flow chart is formed by individual steps of an ultrasonic probe installation step S101, a reference signal generation step S102, an offset time setting step S103, an ultrasonic wave transmission step S104, an ultrasonic wave reception step S105, and a gap length calculation step S106.

As described above, according to the present embodiment, it is possible to measure a gap length between the rotational body and the casing without providing a reference position indication member on the rotational body in the fluid machinery.

Second Embodiment

Figure 6:
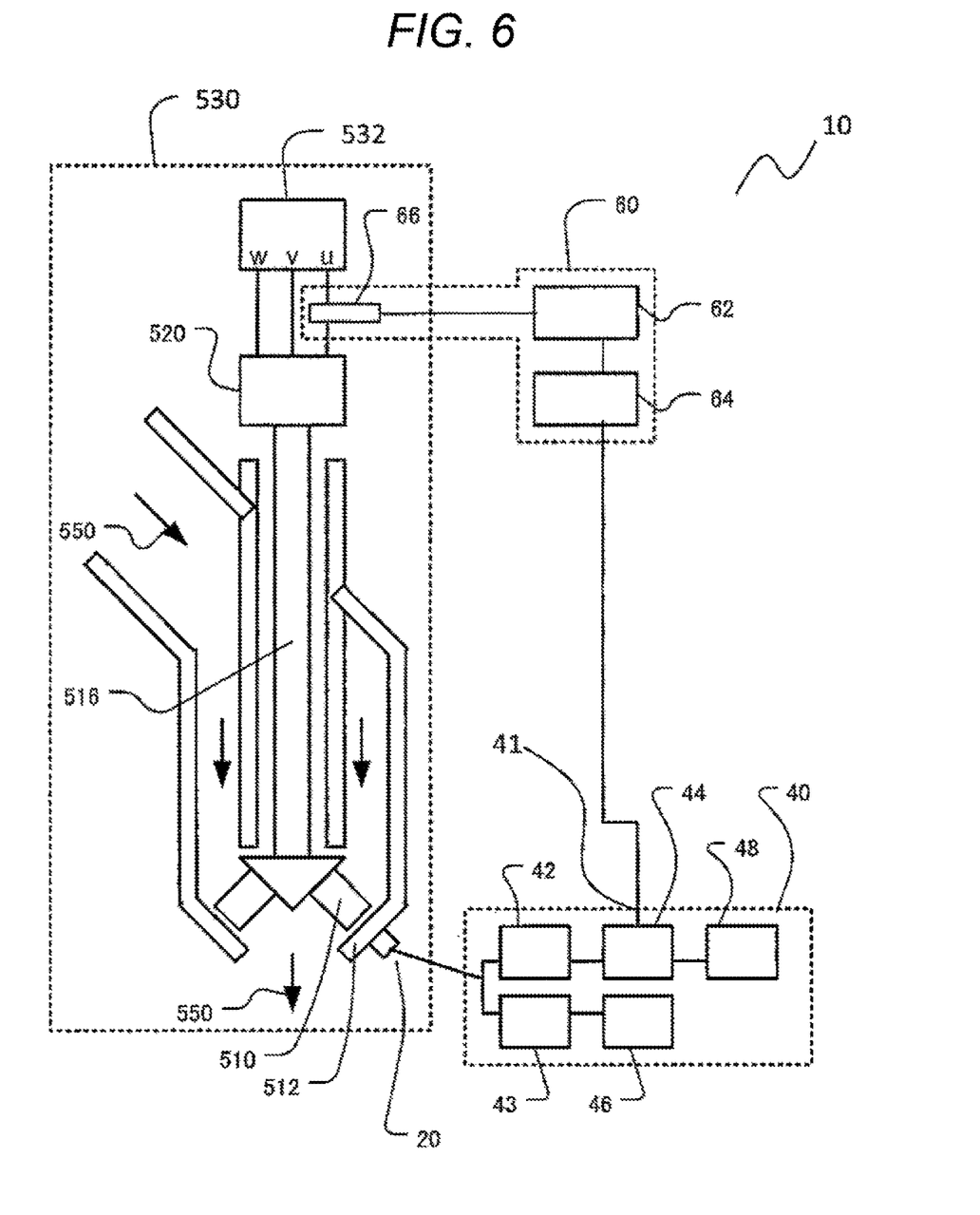
FIG. 6 is a diagram showing a configuration of an ultrasonic measurement apparatus according to a second embodiment.

FIG. 6 is a diagram showing an ultrasonic measurement apparatus according to a second embodiment. The present embodiment is an example in which a water turbine 530 is a measurement object.

In FIG. 6, a configuration of the water turbine 530 as a measurement object will be described. The water turbine 530 includes a rotary blade 510, a casing 512, a main shaft 516, a rotary machine 520 (electrical generator), and a rotary machine conversion unit 532. In this specification, an apparatus including the rotary machine 520 (electrical generator) and the rotary machine conversion unit 532 is called the water turbine 530. In the water turbine, the rotary blade 510 is also called a runner. Further, in the water turbine, the rotary machine 520 is also called an electrical generator.

When fluid flows in a direction illustrated by a fluid flow 550, the rotary blade 510 is rotated by the fluid energy. This rotational movement is transmitted to the rotary machine 520 (electrical generator) by the main shaft 516. The rotary machine 520 (electrical generator) converts the rotational energy into electric energy.

The electric power generated by the rotary machine 520 (electrical generator) is transmitted to the rotary machine conversion unit 532, and converted into a desired electric waveform at the rotary machine conversion unit 532. Specifically, the rotary machine conversion unit 532 changes or stabilizes a frequency and a voltage of the electric power. FIG. 6 shows the example in which the rotary machine 520 (electrical generator) and the rotary machine conversion unit 532 are connected by three-phase wiring, but other than three-phase wiring, for example, two-phase wiring may be adopted.

Next, a configuration of an ultrasonic measurement apparatus 10 in the present embodiment will be described. A configuration of the ultrasonic measurement apparatus in this embodiment is substantially the same as that in the first embodiment. In the present embodiment, a reference signal generation unit 60 operates as follows.

The reference signal generation unit 60 includes a rotary machine signal detection unit 62 and a reference time calculation unit 64. In this implementation, the rotary machine signal detection unit 62 includes a current detection device 66, and the current detection device 66 is installed at wiring connecting the rotary machine 520 (electrical generator) and the rotary machine conversion unit 532.

The rotary machine signal detection unit 62 detects a current waveform in the wiring and transmits the current waveform to the reference time calculation unit. On the basis of the current waveform, the reference signal generation unit 60 generates a reference time signal at a timing corresponding to every one rotation of the rotary blade 510. The reference time signal is transmitted to a measurement circuit unit 40. The electric power transmitted from the rotary machine 520 (electrical generator) to the rotary machine conversion unit 532 is AC power reflecting a rotation state of the main shaft. Therefore, the reference time signal can be generated by the method described in FIG. 2. A configuration and an operation of a measurement probe and the measurement circuit unit are similar to those of the first embodiment, and it is possible to measure the gap length between a rotational body and the casing similarly to the first embodiment.

Note that, in the present invention, the proposed embodiments may be implemented independently or may be implemented in a combination of a plurality of embodiments depending on the circumstances.

The present invention can be implemented in other various forms without departing from the spirit or main features of the present invention. It is needless to say that the embodiments described in this specification are merely examples and should not be interpreted restrictively.

REFERENCE SIGNS LIST

L gap length
10 ultrasonic measurement apparatus
20 ultrasonic probe
40 measurement circuit unit
41 synchronization signal input unit
42 transmission unit
43 reception unit
44 offset time setting unit
46 gap length calculation unit
48 offset time sweep unit
60 reference signal generation unit
62 rotary machine signal detection unit
64 reference time calculation unit
66 current detection device
501 pump
510 rotary blade
512 casing
516 main shaft
520 rotary machine
522 rotary machine driving unit
530 water turbine
532 rotary machine conversion unit
tof offset time
S101 ultrasonic probe installation step
S102 reference signal generation step
S103 offset time setting step
S104 ultrasonic wave transmission step
S105 ultrasonic wave reception step
S106 gap length calculation step

The invention claimed is:

1. An ultrasonic measurement apparatus which applies to fluid machinery having a rotational body as a measurement object, the ultrasonic measurement apparatus comprising:
an ultrasonic probe installed and used outside a casing part of the fluid machinery, the casing part accommodating the rotational body;
a measurement circuit unit electrically connected to the ultrasonic probe; and
a reference signal generation unit, wherein
the measurement circuit unit includes a gap calculation unit configured to calculate a gap length between the rotational body and the casing part,
the reference signal generation unit includes a rotary machine signal detection unit to be electrically connected to a rotary machine conversion unit, and a reference time generation unit electrically connected to the rotary machine signal detection unit,
the measurement circuit unit includes an offset time setting unit configured to make an offset time variable, the offset time spanning from a reference time signal outputted from the reference time generation unit to transmission by the ultrasonic probe; and
the fluid machinery is a pump.

2. The ultrasonic measurement apparatus according to claim 1, wherein
the measurement circuit unit includes an offset time sweep unit, and
a gap length is calculated while the offset time sweep unit sweeps a plurality of offset times as the offset time.

3. The ultrasonic measurement apparatus according to claim 1, wherein
the gap calculation unit calculates the gap length by measuring a repetition period due to multiple reflection of an ultrasonic wave.

4. An ultrasonic measurement method in which fluid machinery having a rotational body is a measurement object, the ultrasonic measurement method comprising:
a step of generating a reference time signal corresponding to rotation of the rotational body;
a setting step of setting an offset time spanning from the generated reference time signal until transmission of an ultrasonic wave from an ultrasonic probe installed and used outside a casing part of the fluid machinery, the casing part accommodating the rotational body;
a step of transmitting an ultrasonic wave from the ultrasonic probe after delaying the offset time;
a step of receiving the transmitted ultrasonic wave; and
a step of calculating a gap length between the rotational body and the casing part from the received ultrasonic wave;
wherein the fluid machinery is a pump.

5. The ultrasonic measurement method according to claim 4, wherein
the gap length is calculated while a plurality of offset times are swept as the offset time.

6. The ultrasonic measurement method according to claim 4, wherein
in calculation of the gap length, a gap length is calculated by measuring a repetition period due to multiple reflection of an ultrasonic wave.

7. The ultrasonic measurement apparatus according to claim 2, wherein
the gap calculation unit calculates the gap length by measuring a repetition period due to multiple reflection of an ultrasonic wave.

8. The ultrasonic measurement method according to claim 5, wherein
in calculation of the gap length, a gap length is calculated by measuring a repetition period due to multiple reflection of an ultrasonic wave.

* * * * *